United States Patent
Adwan (10) Patent No.: US 11,999,350 B2
(45) Date of Patent: Jun. 4, 2024

(54) VEHICLE CONTROL SYSTEM AND METHOD

(71) Applicant: JAGUAR LAND ROVER LIMITED, Coventry (GB)

(72) Inventor: Adam Adwan, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 428 days.

(21) Appl. No.: 17/294,381

(22) PCT Filed: Nov. 14, 2019

(86) PCT No.: PCT/EP2019/081316
§ 371 (c)(1),
(2) Date: May 14, 2021

(87) PCT Pub. No.: WO2020/099558
PCT Pub. Date: May 22, 2020

(65) Prior Publication Data
US 2022/0009492 A1 Jan. 13, 2022

(30) Foreign Application Priority Data
Nov. 14, 2018 (GB) ...................... 1818544

(51) Int. Cl.
*B60W 60/00* (2020.01)
*B60W 30/095* (2012.01)
*B60W 30/18* (2012.01)
*B60W 40/04* (2006.01)
*B60W 40/105* (2012.01)

(52) U.S. Cl.
CPC .. *B60W 30/18163* (2013.01); *B60W 30/0956* (2013.01); *B60W 40/04* (2013.01); *B60W 40/105* (2013.01); *B60W 60/0015* (2020.02); *B60W 60/00274* (2020.02); *B60W 2520/105* (2013.01); *B60W 2554/804* (2020.02)

(58) Field of Classification Search
None
See application file for complete search history.

(56) References Cited

U.S. PATENT DOCUMENTS 6,353,788 B1 * 3/2002 Baker .................... G08G 1/166
340/436
9,576,483 B2 2/2017 Maass
(Continued)

FOREIGN PATENT DOCUMENTS

| CN | 104781125 A | 7/2015 |
|---|---|---|
| CN | 105292103 A | 2/2016 |

(Continued)

OTHER PUBLICATIONS

International Search Report corresponding to International Application No. PCT/EP2019/081316, dated Apr. 1, 2020, 6 pages.
(Continued)

*Primary Examiner* — Peter D Nolan
*Assistant Examiner* — Jacob Kent Besteman-Street
(74) *Attorney, Agent, or Firm* — Reising Ethington P.C.

(57) ABSTRACT

There is disclosed a control system and a method for a host vehicle operable in an autonomous mode. The control system comprises one or more controllers. The speed and/or path of the vehicle in the autonomous mode is appropriate to a driving context.

11 Claims, 2 Drawing Sheets

(56) References Cited

U.S. PATENT DOCUMENTS

| | | | |
|---|---|---|---|
| 10,173,685 B2 | 1/2019 | Schaper et al. | |
| 10,207,712 B2 | 2/2019 | Schaper et al. | |
| 2012/0271539 A1 | 10/2012 | Bald | |
| 2015/0321699 A1 | 11/2015 | Rebhan | |
| 2015/0360721 A1* | 12/2015 | Matsuno | B60W 30/18163 |
| | | | 701/1 |
| 2016/0137199 A1 | 5/2016 | Kühne | |
| 2018/0025645 A1* | 1/2018 | Schwindt | G08G 1/166 |
| | | | 701/301 |
| 2019/0054922 A1* | 2/2019 | Yalla | B60W 10/08 |

FOREIGN PATENT DOCUMENTS

| | | |
|---|---|---|
| CN | 107010055 A | 8/2017 |
| DE | 102015219578 A1 | 4/2017 |
| DE | 102016000185 A1 | 7/2017 |
| DE | 102016000201 A1 | 7/2017 |
| EP | 2942765 A1 | 11/2015 |
| JP | 2016009201 A | 1/2016 |
| KR | 20180056323 A | 5/2018 |

OTHER PUBLICATIONS

Written Opinion corresponding to International Application No. PCT/EP2019/081316, dated Apr. 1, 2020, 6 pages.
Combined Search and Examination Report corresponding to Great Britain Application No. GB1818544.7, dated May 13, 2019, 5 pages.
Chinese Office Action corresponding to Chinese application 201980088268.6, dated Apr. 12, 2023, 14 pages.

* cited by examiner

VEHICLE CONTROL SYSTEM AND METHOD

TECHNICAL FIELD

The present disclosure relates to a vehicle control system and method. In particular, but not exclusively it relates to a vehicle control system and method for a vehicle operable in an autonomous mode.

Aspects of the invention relate to a control system, a method, a vehicle, computer software, and a non-transitory computer-readable storage medium.

BACKGROUND

It is known for a vehicle to host a system that enables the host vehicle to operate in accordance with a predefined autonomous mode. The host vehicle may be instructed to operate in accordance with the predefined autonomous mode by a user (occupant) of the host vehicle i.e. via an input device at which a user input is received to control operation of the predefined autonomous mode.

The occupant may desire for the speed and path of the host vehicle in the autonomous mode to be appropriate to a driving context. The driving context may relate to factors such as the environment outside the host vehicle. The environment includes infrastructure and other road users (ORUs). The driving context may relate to the specific preferences of the occupant. The driving context may relate to the condition of the host vehicle.

It is an aim of the present invention to address disadvantages of the prior art.

SUMMARY OF THE INVENTION

Aspects and embodiments of the invention provide a control system, a method, a vehicle, computer software, and a non-transitory computer-readable storage medium.

According to an aspect of the invention there is provided a control system for a host vehicle operable in an autonomous mode, the control system comprising one or more controllers, the control system configured to: determine a requirement for the host vehicle within a first lane to manoeuvre into a second lane to perform an overtake; check whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and if the abort condition is satisfied, cause the host vehicle to remain in the first lane.

This advantageously reduces the chance of a traffic conflict, because it is ensured that the host vehicle is likely to retain its place in traffic in case of a last-minute abort of the manoeuvre.

The one or more controllers may collectively comprise: at least one electronic processor having an electrical input for receiving information for enabling the determination; and at least one electronic memory device electrically coupled to the at least one electronic processor and having instructions stored therein; and wherein the at least one electronic processor is configured to access the at least one memory device and execute the instructions thereon so as to cause the host vehicle to perform the determining a requirement, the checking whether the abort condition is satisfied, and the causing the host vehicle to remain in the first lane.

The control system may be configured to: check whether a second abort condition is satisfied, wherein if the abort condition and the second abort condition are not satisfied, the host vehicle completes the manoeuvre into the second lane, and wherein if any one or more of the abort condition and the second abort condition is satisfied, the host vehicle remains in the first lane.

Satisfaction of the second abort condition may be determined by checking for another road user within the second lane.

The overtake may be an overtake of a road user, wherein the control system may be configured to increase separation of the host vehicle from the road user to be overtaken in dependence on the determination; subsequently cause acceleration of the host vehicle towards the road user to be overtaken, such that the host vehicle achieves a higher speed than the road user to be overtaken; and manoeuvre the host vehicle into the second lane to perform the overtake.

The control system may be configured to check the abort condition (relating to the third lane) at least after the host vehicle has commenced accelerating towards the road user to be overtaken.

The amount of the increased separation and/or acceleration may be dependent on one or more of: at least one speed-dependent variable associated with the host vehicle and/or the road user to be overtaken; at least one variable associated with another road user behind the host vehicle; a variable associated with infrastructure.

According to another aspect of the invention there is provided a method for controlling a host vehicle operable in an autonomous mode, the method comprising: determining a requirement for the host vehicle within a first lane to manoeuvre into a second lane to perform an overtake; checking whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and if the abort condition is satisfied, causing the host vehicle to remain in the first lane.

According to another aspect of the invention there is provided a method for controlling a host vehicle operable in an autonomous mode, the method comprising: determining a requirement for the host vehicle within a first lane to manoeuvre into a second lane; checking whether an abort condition is satisfied, wherein satisfaction of the abort condition is determined by checking a third lane for another road user converging with or alongside the host vehicle before the host vehicle manoeuvres into the second lane, wherein the third lane is on an opposite side of the first lane to the second lane; and if the abort condition is satisfied, causing the host vehicle to remain in the first lane.

According to a further aspect of the invention there is provided a vehicle comprising any one or more of the control systems described herein.

According to a further aspect of the invention there is provided computer software that, when executed, is arranged to perform any one or more of the methods as described herein.

According to a further aspect of the invention there is provided a non-transitory, computer-readable storage medium storing instructions thereon that, when executed by one or more electronic processors, causes the one or more electronic processors to carry out any one or more of the methods as described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
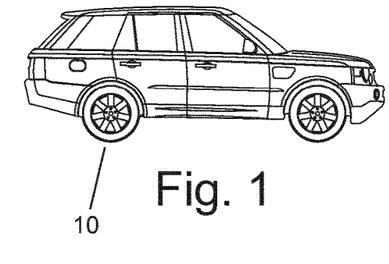
FIG. 1 illustrates an example of a host vehicle.

FIG. 1 illustrates an example of a vehicle 10 in which embodiments of the invention can be implemented. In some, but not necessarily all examples, the (host) vehicle 10 is a passenger vehicle, also referred to as a passenger car or as an automobile. Passenger vehicles generally have kerb weights of less than 5000 kg. In other examples, embodiments of the invention can be implemented for other applications, such as industrial vehicles.

The host vehicle 10 may comprise any appropriate prime mover (not shown) or a plurality of prime movers. An example of a prime mover is an internal combustion engine.

Another example of a prime mover is an electric motor. The vehicle may be an electric vehicle or a hybrid-electric vehicle.

The host vehicle 10 may be operable in an autonomous mode. The host vehicle 10 may also be operable in a non-autonomous mode.

Figure 2A:
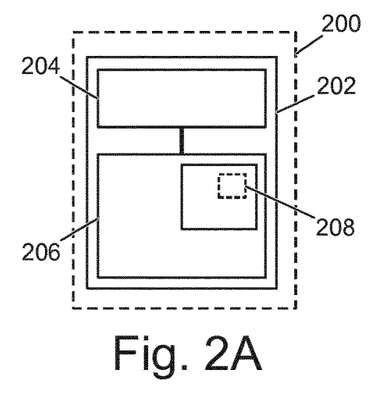
FIG. 2A illustrates an example of an electronic controller.

A control system 200 is shown in FIG. 2A which may implement, at least in part, the functionality of the autonomous mode. The control system 200 may implement, at least in part, the functionality of the non-autonomous mode. The control system 200 may comprise means to cause any one or more of the methods described herein to be performed, at least in part.

The control system 200 may comprise one or more (electronic) controllers 202. One controller 202 is shown in FIG. 2A.

The controller 202 of FIG. 2A includes at least one electronic processor 204; and at least one electronic memory device 206 electrically coupled to the electronic processor 204 and having instructions 208 (e.g. a computer program) stored therein, the at least one electronic memory device 206 and the instructions 208 configured to, with the at least one electronic processor 204, cause any one or more of the methods described herein to be performed.

The control system 200 may be supplied separately from or together with any input devices and any actuators controlled by the control system 200.

Figure 2B:
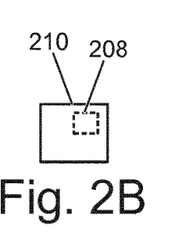
FIG. 2B illustrates an example of a computer-readable storage medium.

FIG. 2B illustrates a non-transitory computer-readable storage medium 210 comprising the computer program 208 (computer software).

Figure 2C:
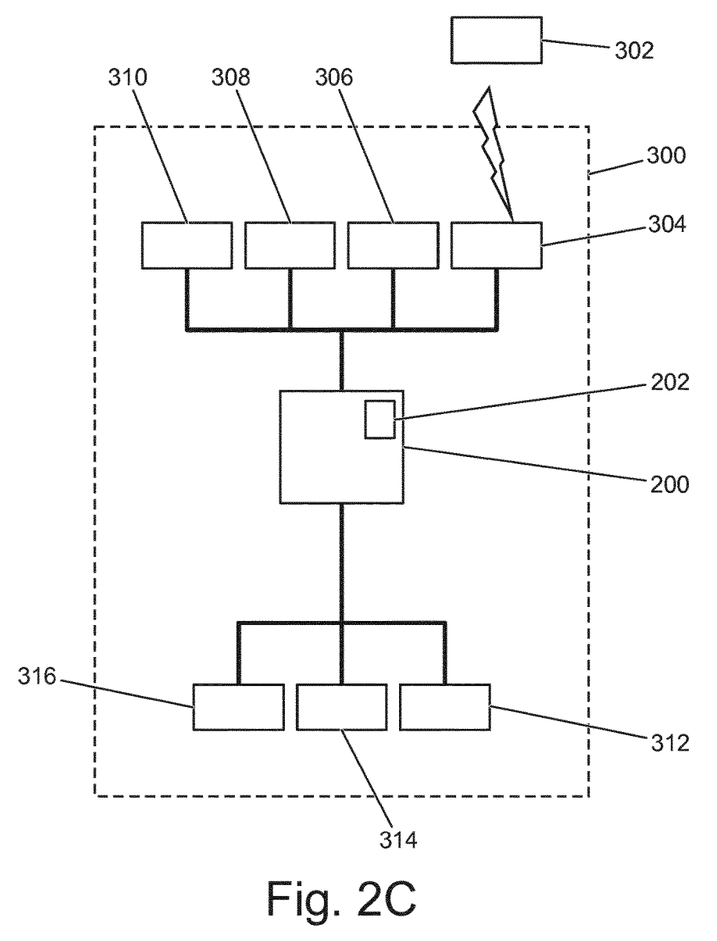
FIG. 2C illustrates an example of a system.

FIG. 2C shows an example of a system 300 for a vehicle such as the host vehicle 10 of FIG. 1. The system 300 may implement, at least in part, the functionality of the autonomous mode.

The system 300 comprises the control system 200. The system 300 may comprise one or more actuators for operation by at least the control system 200 in at least the autonomous mode. The actuators may be operably (directly or indirectly) coupled to one or more outputs of one or more controllers of the control system 200.

The actuators may comprise one or more torque control actuators. The torque control actuators are for controlling torque received at one or more road wheels of the host vehicle 10.

The torque control actuators may comprise a brake control actuator 316.

The brake control actuator 316 comprises any appropriate means for controlling a negative torque received by road wheels of the host vehicle 10.

In an implementation, the brake control actuator 316 may comprise a friction brake actuator for applying friction brakes of the host vehicle 10.

The brake control actuator 316 may be operated in dependence on an output signal such as a brake demand signal output from the control system 200, in the autonomous mode.

The torque control actuators may comprise an acceleration control actuator 312.

The acceleration control actuator 312 comprises any appropriate means for controlling a positive torque received by road wheels of the host vehicle 10, for instance means for controlling a torque output of the prime mover.

In an implementation, the acceleration control actuator 312 may comprise a throttle position actuator for controlling an opening degree of a throttle for an internal combustion engine.

The acceleration control actuator 312 may be operated in dependence on an output signal such as a torque demand signal output from the control system 200, in the autonomous mode.

The actuators may comprise a steering control actuator 314. The steering control actuator is part of a steering subsystem of the host vehicle 10, for controlling the direction of the host vehicle 10.

The steering control actuator 314 comprises any appropriate means for controlling a direction of the host vehicle 10, for instance means for controlling a steering angle of front road wheels of the host vehicle 10.

In an implementation, the steering control actuator 314 may comprise a motor for actuating a steering rack of the host vehicle 10. Additionally or alternatively, the steering control actuator 314 may comprise a friction brake actuator, configured to control a braking torque differential between left and right wheels of the host vehicle 10.

The steering control actuator 314 may be operated in dependence on an output signal such as a steering signal output from the control system 200, in the autonomous mode.

One or more of the actuators 312, 314, 316 may be operable automatically by the control system 200 in the autonomous mode. One or more of the actuators may be operable under manual control by a vehicle occupant in the non-autonomous mode.

The system 300 may comprise one or more input devices 304, 306, 308, 310. The input devices may be coupled to one or more inputs of one or more controllers of the control system 200.

The signals to the actuators may be dependent on signals from the input devices.

The input devices may comprise sensing means 306, 308, 310, such as one or more sensor units. The sensing means may enable machine vision for autonomous driving.

The sensing means outputs to the control system 200 environment information indicative of the environment in the vicinity of the host vehicle 10. The environment information is indicative of one or more environment characteristics, e.g. road type, presence of other road users, road markings, road priorities, etc.

The sensing means may be configured for or suitable for attachment to the host vehicle 10. The sensing means may comprise an optical sensor such as a (visual) camera 308. An optical sensor is for imaging in the visible light spectrum.

The sensing means may comprise range detection means 310. The term "range detection means" will be understood to mean any sensing means for detecting sensor data indicative of a range of a target object from the host vehicle 10. The range detection means 310 may comprise a rangefinder. The range detection means 310 may comprise a laser rangefinder. The laser rangefinder may comprise a lidar sensor. The control system 200 with at least one of the sensing means may be arranged to capture a doppler shift in an emitted signal. The sensing means may comprise a radar sensor 306. The sensing means may comprise an ultrasound sensor (not shown).

The system 300 may comprise a plurality of the input devices, each input device representing a different sensing modality. For example, the system 300 may comprise lidar sensors, radar sensors and cameras. This redundancy improves safety and enables autonomous driving in various environments such as driving at night or through fog.

The sensing means may be capable of detecting objects within a first sensing range. The first sensing range may be, at most, a maximum line of sight distance from the sensing means. The first sensing range may be from approximately 80 m to approximately 100 m from the location of the sensing means.

Objects may be recognised by a classification process (algorithm) of the control system 200. Objects which may be classified may include one or more of: automobiles; heavy goods vehicles; motorcycles or pushbikes; emergency services vehicles; road signs and their instructions (including temporary street furniture such as traffic cones); and road markings and their instructions. The locations of the objects may be determined, for example using range detection means 310. Which lane the objects are in may be determined. A relative speed between the host vehicle 10 and an object may be determined, which may indicate whether a separation (also referred to as headway, inter-vehicular distance, following distance) from the object is increasing or decreasing and at what rate. The movement of the objects may be tracked using optical flow analysis for example.

The sensing means collectively provide a field of view around the host vehicle 10. The field of view may extend 360 degrees horizontally around the host vehicle 10 or less. The collective field of view also extends vertically by any appropriate amount. The individual sensor units may be located at the front, rear and/or sides of the host vehicle 10. Sensor units may be located at corners of the host vehicle 10. Sensor units may be located on wing mirrors of the host vehicle 10. Some sensor units may be located high on the host vehicle 10, such as above the waist of the host vehicle 10. Some sensor units may be at bumper height or lower.

The input devices may communicate with the control system 200 using any appropriate electronic communication network. Similarly, the actuators may be configured for drive-by-wire operation, therefore communication between the control system 200 and the actuators may also be via any appropriate electronic communication network. Redundancy may be provided by implementing multiple communication networks and/or backup controllers in the control system 200 and/or backup power supplies coupled to independent power sources (e.g. batteries). Example communication networks include a Controller Area Network (CAN), an Ethernet network, a Local Interconnect Network, a FlexRay™ network or the like.

The system 300 may comprise a telematics unit 304. The telematics unit 304 may comprise one or more controllers. The telematics unit 304 may be a telematics control unit (TCU). The illustrated TCU does not form part of the control system 200 but it may do in other examples. The TCU may be configured at least to function as a vehicle software update client. The TCU may comprise an antenna arrangement. The antenna arrangement may be configured as a receiver, a transmitter or as a transceiver. This enables software updates to be obtained from a remote (offboard) information source 302 such as a server, another vehicle according to a vehicle-to-vehicle (V2V) communication model, or external infrastructure according to a vehicle-to-infrastructure (V2I) communication model.

The TCU may be configured to download software-over-the-air (SOTA) updates for installation in the host vehicle 10. Software components for SOTA updates could include at least one of: executable code, configuration data, graphics, map data, dynamic data such as dynamic map data and dynamic traffic data and weather data, audio calibration, multimedia, and firmware.

SOTA updates are received via a wireless communication network, such as a cellular network. The host vehicle 10 may subscribe to a cellular network service. The TCU may comprise a subscriber identity such as an international mobile subscriber identity (IMSI) number, to facilitate access to the cellular network. A subscriber identity module (SIM) may be installed in the host vehicle 10 to enable the TCU to access the IMSI and therefore the cellular network. An operator of the cellular network may associate the IMSI with a customer account and bill the customer for data usage and/or access to the cellular network. Additionally or alternatively, the TCU may comprise means to access a short-range communication network such as a wireless local area network or a wireless personal area network. The TCU may comprise means, such as a universal serial bus interface, for wired communication with the remote information source 302.

Advantageously, SOTA functionality enables the dynamic data to be downloaded while the host vehicle 10 is undergoing a journey. This enables substantially live updates. The telematics unit 304 may be configured to schedule the SOTA downloads from the remote information source 302 according to push or pull methods. Client-server, V2V and/or V2I communication models could be used. The telematics unit 304 may be configured to perform the downloads periodically at a predetermined interval which may depend on the download payload. For instance, the interval for downloading dynamic traffic data may range from the order of minutes to the order of hours. The interval for downloading dynamic map data may range from the order of minutes to the order of months. The interval for downloading non-dynamic data may range from the order of months to the order of years, or it may need to be manually updated at a dealership.

Dynamic traffic data as described above may be obtained via a SOTA update and/or a service provider application programming interface. Dynamic traffic data comprises substantially live information on traffic conditions. For example, the dynamic traffic data may indicate slow moving or stopped traffic. The dynamic traffic data may be associated with one or more metrics associated with traffic density, flow rate, speed, inter-vehicular distance, or journey time. The metrics may indicate a current condition, a change, or an expected condition. The metrics may be associated with particular locations and/or with particular times. Falling speeds/flow rates/inter-vehicular distances and rising densities/journey times are indicators of traffic conditions.

The dynamic traffic data enables a traffic condition to be determined. The traffic condition could be determined by comparing a current condition with a change or expected condition. A traffic condition could be determined when at least one threshold is passed such as an absolute or relative threshold. The relative threshold could be a statistical significance threshold, for example.

The dynamic traffic data may have sufficient resolution, granularity and/or detail to enable the traffic condition to be associated with a specific lane of a highway, from a plurality of lanes for travel in a same direction. This enables certain lanes to be avoided before a traffic queue is reached.

Dynamic map data as described above may comprise information that enables map data stored onboard the host vehicle 10 to be supplemented. The map data may be used by the control system 200 and/or a navigation subsystem of the host vehicle 10 for route planning. Map data indicates at least roads and junctions.

Locations may be indicated by map data via global position coordinates. The navigation subsystem may be configured to receive user navigation inputs defining navigation constraints. Navigation constraints may comprise one or more of a destination, a waypoint, a navigation route or acceptable routes, an avoidance setting (e.g. avoidance of toll roads), a target to be reduced/minimised such as minimum distance or minimum travel time, or a target to be achieved such as a time of departure or arrival. Once a navigation route has been selected, the selected navigation route may impose navigation constraints on the autonomous mode, to enable autonomous navigation.

The dynamic map data and dynamic traffic data may be compatible with said map data. Dynamic map data may comprise indications of at least one of the following conditions: traffic conditions such as roadworks and/or lane closures; speed limit changes such as variable speed limit changes imposed by permanent variable speed limit systems; weather conditions; or road surface conditions. Examples of roadworks include road closures, lane closures and traffic diversion routes. Examples of lane closures include blocked lanes, whether caused by roadworks, broken down vehicles or other causes. Examples of road surface conditions include potholes, loose or broken surface material, low friction hazards (e.g. ice or spilled liquids), or objects in the road (e.g. lost cargo). The indications may specify one or more locations such as where the condition starts and/or ends. The indications may specify which lane or lanes the condition applies to. The indications enable certain lanes or roads to be avoided before a traffic queue is reached. The above indications may be available by analysis of data from the sensing means, however for a much shorter range. Indications from multiple sources, such as the dynamic map data and the sensing means, may be combined to improve certainty.

The map data, dynamic map data and/or dynamic traffic data may comprise a fine level of granularity. For example, the individual lanes for travel in a same direction on a highway may be distinguishable. The map data and/or dynamic map data may comprise a high level of detail. For example, indications of road markings and/or road sign (traffic sign) information may be distinguishable from the data. Distinguishable road markings may comprise indications of lane boundaries. Distinguishable lane boundaries may be indicated by lane boundary markings in the data or may be indirectly indicated by lane centre position information in the data. The map data and/or dynamic map data may be of any suitable format that enables an identification of an instruction regarding a lane, a junction, a right of way (priority) or caution.

The control system 200 may further be configured to determine a highway law applicable to the host vehicle's current location and/or to a planned location or route of the host vehicle 10. The control system 200 may be configured to apply information associated with the applicable highway law to correctly identify instructions from the map data and/or dynamic map data. For example, if a planned route is in the United Kingdom the control system 200 may be configured to recognize road markings or traffic (road) sign information in a manner that corresponds to the requirements of the Highway Code. This is advantageous because the same road markings or signs can have different legal meanings in different highway jurisdictions.

The additional detail from the map data and/or dynamic map data may enable not only improved route planning by a navigation subsystem, but also improved path planning for the autonomous mode. For example, the control system 200 may process the map data and/or dynamic map data to determine which lanes the host vehicle 10 will travel on at which points on a journey. The control system 200 may further determine when lane changes may need to occur as directed by road signs or other information from the data. Certain lanes can be avoided or moved out of before a traffic queue is reached. Further, the dynamic data may define a second sensing range of machine vision, farther than the first sensing range. For example, the dynamic data may at least cover an entire route planned by the navigation subsystem and may cover one or more alternative routes in case of a later route recalculation. This enables certain lanes or roads to be avoided. The dynamic data may cover a regional, national or even international area. However, a greater coverage area may adversely affect a time taken to download updated dynamic data.

The input devices may define one or more sensing modes for detecting objects or contexts such as road markings, road signs or traffic conditions, etc. The map data/dynamic data may define a further sensing mode for detecting at least some of the same objects or contexts. Therefore, some objects and contexts can be determined from plural modes of information. The control system 200 may be configured to aggregate the multi-modal information and process the aggregated data to increase a confidence score of at least one property of the object or context. The property may relate to a presence or absence of the object or context, its location, its size, or anything else useful for autonomous mode driving. This advantageously enables a realistic indication of a driving context within at least the first sensing range. A required manoeuvre may only be performed if the confidence score is above a threshold.

A decision to perform a manoeuvre may be made on the basis of information from a longer-range low-trust sensing mode such as map data and/or dynamic data, but it may be required that the information leading to the decision is subsequently verified using a shorter-range high-trust sensing mode such as the sensing means, for the manoeuvre to be performed. For example, information from the sensing means may be used to verify that information from the map data/dynamic data is accurate, before one or more planned manoeuvres are performed. The longer-range low-trust sensing mode may correspond to map data and/or dynamic data. The shorter-range high-trust sensing mode may correspond to one or more of the above-described sensing means.

Other dynamic data that may be obtainable by the control system 200, e.g. via the TCU, may include dynamic traffic data indicative of an emergency services vehicle location. The dynamic traffic data may indicate if an emergency services vehicle is approaching. This provides advance warning for the host vehicle 10 to manoeuvre out of a position in which it would obstruct the emergency services vehicle. The data may be received from client-server, V2V and/or V2I communication.

The host vehicle 10 may additionally comprise at least one human-machine interface (HMI) (not shown), facilitating access to one or more of the functions of the control system 200 described herein, and/or for presenting one or more outputs of the control system 200 described herein to the occupant (e.g. driver). The presentation may use visual means, audio means or any other appropriate means. User inputs to the HMI may be via touch, gesture or sound-based commands, or any other appropriate means. The HMI may comprise one or more of an output HMI, an input HMI, or an input-output HMI. Examples of output HMI in a vehicle include a centre console display, an instrument cluster display, audio speakers, a head-up display, a rear seat occupant display, a haptic feedback device, or the like. Examples of input HMI include touchscreens, manual actuators such as buttons and switchgear, and sensors for speech command recognition or non-touch gesture recognition. The input HMI may be close to a driver's seat. Advantageously, some input HMI may be located on the steering wheel.

A handover process may be implemented for initiating the autonomous mode, which will now be described. The control system 200 may be configured to receive at least one signal indicative of a suitability of initiation of the autonomous mode. The received signal may be indicative of a vehicle characteristic. The received signal may be indicative of a user characteristic. The received signal may be indicative of an environment characteristic. The received signal may be from the sensing means, or from another part of the control system 200 such as an algorithm that processes the map data and/or dynamic data.

The control system 200 may be configured to cause output of an availability signal indicative of an availability of the autonomous mode in dependence on the received signal, for example for presentation to the occupant via an HMI. If no availability signal is output, the host vehicle 10 is not operable to enter the autonomous mode. The control system 200 may be configured to determine whether to transmit the availability signal in dependence on at least one of the vehicle characteristic, the user characteristic, or the environment characteristic. One or more criteria associated with one or more of the characteristics may need to be satisfied, for the availability signal to be transmitted. An indication of the availability signal may be continuously presented to the occupant until at least one of the criteria is no longer satisfied. The availability signal may be continuously presented to the occupant until a user input is received in response to the availability signal. Examples of the user input and examples of the criteria are defined below.

The control system 200 may be configured to receive the user input in the form of a user activation signal indicative of the occupant's request to initiate the autonomous mode in response to the availability signal. The user input may be made via HMI. The user activation signal may be received during driving of the host vehicle 10, in other words while the host vehicle 10 is in a travelable state. For example, the host vehicle 10 may be in the non-autonomous mode. The control system 200 may be configured to output a driving mode signal to cause the host vehicle 10 to initiate the autonomous mode in response to the user activation signal. Initiating the autonomous mode may comprise a transition phase during which control of vehicle movement is transitioned away from the occupant to the control system 200. A duration of the transition phase may be dependent on one or more of the vehicle characteristic, the user characteristic or the environment characteristic to ensure a smooth transition.

The environment characteristic may be indicative of an environment external to the host vehicle 10 and in the vicinity of the host vehicle 10. The environment may be a driving environment. The driving environment may be a current driving environment while the host vehicle 10 is being driven. The driving environment may be indicative of a type of road on which the host vehicle 10 is driving. Optionally, the control system 200 may be configured not to transmit the availability signal unless at least the environment characteristic satisfies a road type criterion. The environment characteristic may be indicative of other environments too.

The road type criterion may be satisfied if the environment characteristic is indicative that the host vehicle 10 is travelling on a required type of road. The required type may be a motorway. Articles 1(j) and 25 of the Vienna convention on road traffic define the term motorway. A motorway may be referred to as a freeway or highway in some countries. The term 'highway' is used in this document. For those countries which have not ratified the above convention, their highways are defined herein as those which possess many or all of the following characteristics of a highway:

- Use of the road is prohibited to pedestrians, animals, cycles, mopeds unless they are treated as motor cycles, and all vehicles other than motor vehicles and their trailers, and to motor vehicles or motor-vehicle trailers which are incapable, by virtue of their design, of attaining on a flat road a speed specified by domestic legislation. This indication may be provided by a road sign;
- Drivers are forbidden to have their vehicles standing or parked elsewhere than at marked parking sites; if a vehicle is compelled to stop, its driver shall endeavour to move it off the carriageway and also off the flush verge and, if he is unable to do so, immediately signal the presence of the vehicle at a distance so as to warn approaching drivers in time;
- Drivers are forbidden to make U-turns, to travel in reverse, and to drive on to the central dividing strip, including the crossovers linking the two carriageways;
- Drivers emerging on to a motorway shall give way to vehicles travelling on it;
- The road is specially signposted as a motorway;
- The road does not cross at level with any road, railway or tramway track, or footpath;

The road does not serve properties bordering on it;

The road is provided, except at special points or temporarily, with separate carriageways for the two directions of traffic, separated from each other either by a dividing strip not intended for traffic.

The road type criterion may not be satisfied if the road is of another type and/or does not possess all or at least certain ones of the above characteristics. For example, some roads are main roads that possess many of the above characteristics but allow pedestrians and non-motorized vehicles to use the roads. The availability signal may not be transmitted for such roads.

In other examples, the required type of road may be another type of road rather than a highway, or the requirement may merely be that the host vehicle 10 is not on a certain type of road such as a minor or urban road. Optionally, the road may be required to possess multiple lanes in a direction of travel of the host vehicle 10 to satisfy the road type criterion. In other examples, there may be no road type criterion for entering the autonomous mode.

The driving environment such as the type of road may be determined directly from metadata in the map data. The metadata may be indicative that the road is a highway. Alternatively, the required type may be determined indirectly from indications that the road possesses one or more of the above characteristics. Indications of the above characteristics may be determined by recognition of relevant road signs or road markings conveying these requirements, or by recognition of infrastructure such as a dividing strip. This may be detected by the sensing means and recognized by an object classification algorithm or determined from the map data or dynamic map data.

The environment characteristic may be indicative of a current weather condition in the vicinity of the host vehicle 10 or an upcoming weather condition to be encountered by the host vehicle 10. Information indicative of a weather condition may be indicative of rain falling on the host vehicle 10. The information may be indicative of the presence of snow or ice on the ground. The information may be indicative of at least one of a temperature, a humidity, a wind speed, a visibility, atmospheric pressure, precipitation. The control system 200 may be configured to not output the availability signal unless at least one weather criterion is satisfied. weather criterion may be satisfied if an indicated weather condition is a predetermined acceptable weather condition or is not a predetermined unacceptable weather condition. A weather criterion may be satisfied if an indicated temperature is within a predetermined acceptable temperature range. A weather criterion may be satisfied if an indicated humidity is within a predetermined acceptable humidity range. A weather criterion may be satisfied if an indicated atmospheric pressure is within a predetermined acceptable pressure range. The weather condition may be determined from a sensor on the host vehicle 10 or from information downloaded from an offboard weather service.

The user characteristic may be indicative of a current user characteristic of the occupant of the host vehicle 10 while the host vehicle 10 is being driven by the occupant. The user characteristic may be indicative of an awareness of the occupant of the vehicle. Information indicative of the awareness of the occupant may be obtained from one or more user sensors (not shown). The one or more user sensors may comprise at least one of a camera 308 and a physiological sensor to capture data indicative of the awareness of the occupant. The control system 200 may be configured not to output the availability signal unless at least one awareness criterion is satisfied. The occupant's awareness may need to be above a predetermined awareness threshold to satisfy the awareness criterion. In an implementation, the awareness may be quantified by numerical indicators such as a frequency or length of time for which the occupant's gaze has not been within a predefined area associated with driving, a blink rate, a head pose angle, or the like. In other words, the autonomous mode may be unavailable to the occupant of the host vehicle 10 if the occupant is not sufficiently aware to be able to resume control of the host vehicle 10 from the autonomous mode if required. In some examples, the occupant characteristic may relate to a physiological state. To satisfy a physiological criterion for the availability signal, quantifiable indicators such as heart rate or brain activity may be detected using one or more biometric sensors.

The user characteristic may be indicative of a separation of at least a part of the occupant from one or more controls of the host vehicle 10. For example, the user characteristic may be indicative of whether one or more hands of the occupant are on the steering wheel. The availability signal may be determined not to be output unless at least a non-separation criterion is satisfied. The non-separation criterion may be satisfied if one or more hands of the occupant are on the steering wheel.

The vehicle characteristic may be indicative of a current vehicle characteristic of the host vehicle 10 while the host vehicle 10 is being driven. The vehicle characteristic may be indicative of a current speed of the host vehicle 10. Information indicative of the current speed could be obtained from a speed sensor (not shown). The availability signal may be determined not to be output unless at least a speed criterion is satisfied. The speed criterion may be satisfied if an indicated current speed of the host vehicle 10 is within a predetermined acceptable speed range, such as less than an upper limit of about 130 kilometres per hour. Other vehicle characteristics may be checked too such that the availability signal is determined not to be output in one or more of the following situations: a $t_y$re pressure is outside a predetermined acceptable range; an oil level is below a predetermined threshold; a fuel level is below a predetermined threshold; the host vehicle 10 is towing; a loaded weight of the host vehicle 10 exceeds a predetermined threshold; or a state of health of one or more components of the host vehicle 10, e.g. a traction battery, is outside a predetermined acceptable state of health.

The vehicle characteristic may be indicative of a detection range of one or more of the sensing means. The detection range may be less than the first sensing range in certain conditions, particularly weather conditions such as fog. The availability signal may be determined not to be output unless at least a detection range criterion is satisfied. The detection range criterion may be satisfied if the received signal is indicative that the detection range of the one or more sensing means is greater than a predetermined range threshold. The autonomous mode may be unavailable to the occupant of the host vehicle 10 if the detection range of the one or more sensors does not meet the predetermined range threshold.

Once the transition phase is entered, control of the host vehicle 10 moves away from the occupant and to the control system 200 of the host vehicle 10. The transition phase may comprise modifying a vehicle movement in preparation for the end of the transition phase. For example, a steering of the host vehicle 10 may be controlled autonomously during the transition phase to substantially centre the host vehicle 10 within a lane of the road. A braking torque of the host vehicle 10 may be controlled autonomously during the transition phase to control a distance of the host vehicle 10 from a further vehicle ahead of the host vehicle 10 along a road.

During the transition phase, the host vehicle 10 may also continue to respond to manual control inputs from the occupant. As the transition phase progresses, the host vehicle 10 may become less responsive to user control until the host vehicle 10 is controlled fully autonomously in the autonomous mode. The occupant is informed of progress through the transition phase by the transition signal described hereinbefore.

Once the transition phase is complete, the control system 200 controls the host vehicle 10 in the autonomous mode. SAE International's J3016 defines six levels of driving automation for on-road vehicles. The term autonomous mode as used herein will be understood to cover any of the SAE levels three or higher, such that the control system 200 will control all aspects of the dynamic driving task. At levels four or five, one or more aspects of one or more of the handover processes described herein for transitioning to and/or from the autonomous mode may not be implemented.

Driver-assistance functions such as cruise control, adaptive cruise control, a lane change assistance function, or a lane keeping function, are at a lower level of autonomy than the autonomous mode.

In the autonomous mode the occupant may not be required to keep one or more hands on the steering wheel, so a monitoring step requiring the occupant to keep one or more hands on the steering wheel may be omitted. In other implementations, the autonomous mode may require the monitoring step. Whether the hand(s) are on the steering wheel may be determined using any appropriate sensing means such as a touch sensor or camera or steering wheel torque/angle sensor. The monitoring may be performed periodically or continuously. If the hands are not on the steering wheel, one or more prompts may be issued.

The host vehicle 10 may comprise a driver distraction function. One or more distraction criteria associated with the driver distraction function may be inhibited upon entering the autonomous mode. For example, in the non-autonomous mode the driver distraction function may alert the occupant when their gaze points outside a predetermined area such as the windscreen. The alert may be transmitted when the gaze is outside the predetermined area for a threshold duration and/or frequency. In the autonomous mode the driver distraction function may be disabled or the predetermined thresholds may be modified to become more permissive.

While the host vehicle 10 is in the autonomous mode, one or more algorithms are implemented for controlling speed and/or direction of the host vehicle 10. The control system 200 transmits the output signals to the actuators in dependence on the algorithms. The algorithms may comprise at least some of: a lane centring algorithm; a lane change algorithm; a path planning algorithm; a speed control algorithm; a machine learning algorithm. The algorithms may be context-aware.

The algorithms may process information from one or more of the sensing means; map data; dynamic data; and navigation constraints. For example, the algorithms may be traffic-aware from the dynamic traffic data. The algorithms may interoperate with each other to determine the output signals. The algorithms may plan variations of the output signals over a future period of driving.

Algorithms for autonomous driving are known and include regression algorithms, classification algorithms, clustering, and decision matrix algorithms. Cost or loss functions may be employed to find optimal paths and speeds and minimize risk to humans.

The lane centring algorithm is for keeping the host vehicle 10 within a predetermined lateral position (target lane position) within lane lateral edges (lane boundaries). The lane boundaries may be identified by specific road markings under the relevant highway law. If road markings are not visible, for instance due to faded paint, a putative lane and/or its boundaries may be identified based on detection of a traffic corridor of other road users driving in a detected consistent manner, e.g. in lines.

The lane position may be off-centre on occasion, dependent on detected characteristics such as environment characteristics, e.g. other road users or infrastructure proximal to a lane boundary. This provides a reassuring separation between the host vehicle 10 and lateral objects. A minimum separation from one or both lane boundaries may be maintained. The minimum separation may be around 0.3 to 0.6 metres from the nearside boundary, optionally 0.5 metres.

The lane change algorithm may be for keeping the host vehicle 10 within a nearside lane if required by applicable highway law. The lane change algorithm may enable the host vehicle 10 to manoeuvre from a first lane to a second lane to avoid detected traffic. The lane change algorithm may enable the host vehicle 10 to implement a vehicle overtaking function to overtake another road user. The lane change algorithm may enable the host vehicle 10 to change lanes to follow a navigation route. A turn signal/indicator of the host vehicle 10 may be flashed automatically just before the lane change is performed.

Keeping the host vehicle 10 within a nearside lane may be the responsibility of a nearside bias function of the lane change algorithm. The nearside bias function may require a nearside lane to be selected in normal driving conditions. The nearside bias function may comprise one or more parameters that define constraints to be met. The constraints may be for lane hogging avoidance. An example constraint may be to delay changing lane from a nearside lane to an offside lane to overtake other road users until the overtake can be performed within a threshold time. A related constraint may be to change lane from the offside lane back to the nearside lane following an overtake as soon as possible. The threshold time may be the time spent outside the nearside lane without overtaking another road user in the nearside lane. The threshold may depend on applicable highway law but tends to be of the order of tens of seconds rather than minutes.

Whether a lane change is performed may depend on a space availability signal indicative of a presence of a space in front of or behind another road user of a size sufficient to accommodate the host vehicle 10, should the host vehicle 10 need to change lanes to occupy that space. The space availability signal may be determined in dependence on inputs from the sensing means. The space availability signal may affect where, when and/or how fast a manoeuvre is performed. For example, the space availability signal may be used by the speed control algorithm when the lane change algorithm determines a requirement for a lane change. The space may be in a target lane for the lane change. The space may be between a lead (downstream) other road user and a rear (upstream) other road user. The space may be a current or expected space. The control system 200 may be configured to determine if the expected space will have a size sufficient to accommodate the host vehicle 10 at a predetermined time in the future. Determination of the expected space may depend on a detected indication of a relative speed of the other road user or users. The speed may be controlled in dependence on the space availability signal, for example to ensure that the space in front of and behind the host vehicle 10 is of a sufficient, e.g. above-threshold, detected size. The threshold size is an example of a manoeuvring constraint to be satisfied before the manoeuvre can be performed. The threshold may depend on the speed of the host vehicle 10. The speed of the host vehicle 10 may be controlled before the lane change. The speed may be controlled to be close to a speed of a lead other road user, a speed of a rear other road user, or between both.

The path planning algorithm may be for planning a specific path to be followed. Planning the path comprises determining one or more manoeuvre requirements indicative of required manoeuvres of the host vehicle 10. A manoeuvre is defined herein as a change of speed or course. Changing course may be performed using the steering control actuator.

Absent of navigation constraints, the path may follow the highway as far as possible. With navigation constraints, the path may follow those portions of the navigation route during which the autonomous mode is on or available. The path may extend beyond the first sensing range. The portion of the path within the first sensing range may be optimised. Examples of optimisations include reducing/minimizing targets such as derivatives of velocity (acceleration, jerk) when steering the host vehicle 10. Cost functions or the like may be used to perform optimisations.

The speed control algorithm is for planning a required speed of the host vehicle 10 to be followed using the torque control actuators. The speed control algorithm may enable functions such as adaptive cruise control, overtaking speed boost, and lane changes. The speed control algorithm may also be for complying with a speed limit detected using road sign recognition or map data. The speed may be controlled in advance of traffic conditions beyond the first sensing range, indicated for example by the dynamic data. The speed control algorithm may determine a speed to maintain a required separation from a lead object and/or rear road user, i.e. a required headway, in accordance with adaptive cruise control methodologies.

The machine learning algorithm is for controlling one or more parameters of one or more of the other algorithms, in dependence on information indicative of past use of the host vehicle 10. The information may be indicative of past use of the host vehicle 10 in the autonomous mode and/or the non-autonomous mode. The information may be indicative of inputs such as steering inputs, acceleration inputs and braking inputs. The information may be indicative of environment characteristics. The information may be associated with information from the sensing means. The information may be associated with traffic conditions, road works or the like. The information may be indicative of locations of the past use. The information may be indicative of a temporal pattern of use of the host vehicle 10. For example, the times of the past use may have been recorded. The temporal pattern may enable locations visited at a recurring time and/or day and/or date to be established, such as a workplace. The information may be used for training of the machine learning algorithm. Machine learning enables an optimization of vehicle behavior for repeated journeys. Further, at least some of the parameters may be user-settable using HMI according to preference.

Whether a manoeuvre is performed may be subject to one or more manoeuvring constraints. If a manoeuvring constraint cannot be satisfied, the path planning algorithm may need to modify the manoeuvre or an abort condition for aborting the manoeuvre may even be satisfied. In an example, the abort condition may be satisfied when the cost of performing the manoeuvre is high. The abort condition may be satisfied when the cost of performing the manoeuvre is higher or a threshold amount higher than the cost of performing a different manoeuvre. If an abort condition is satisfied, the manoeuvre is not performed. The abort conditions may be checked just before performing the manoeuvre. An example check for satisfaction of the abort condition comprises continually detecting objects as described above. An object may render an intended manoeuvre or already planned path inappropriate. A static object obstructing the path may be such an object. Examples include roadworks or debris intersecting the path. Another road user, whether moving or not, may also render the manoeuvre or path inappropriate. The check may be dependent on an expected trajectory of the other road user relative to the planned path of the host vehicle 10. If the other road user is predicted to need to change its speed and/or course as a result of the manoeuvre by the host vehicle 10, the abort condition may be satisfied. The check may depend on detection of signals of intent from the other road users such as turn signals. If an abort condition is satisfied, the host vehicle 10 may remain in the autonomous mode and the speed and/or path may be re-planned accordingly.

In certain circumstances, the autonomous mode may need to hand control at least partially back to the occupant by switching to the non-autonomous mode. The non-autonomous mode may be entirely non-autonomous or may be less autonomous than the autonomous mode. The non-autonomous mode may require manual control or at least supervision by a human driver. The non-autonomous mode may comprise one or more driver assistance functions. For example, the non-autonomous mode may comprise at least one of the following functions: cruise control; adaptive cruise control; lane keeping assistance; braking assistance; overtaking assistance; parking assistance.

The control system 200 may be configured to receive at least one further signal indicative of a requirement to switch from the autonomous mode to the non-autonomous mode. The further signal may be indicative of a vehicle characteristic. The further signal may be indicative of a user characteristic. The further signal may be indicative of an environment characteristic. The further signal may be from the sensing means, or from another part of the control system 200 such as an algorithm that processes the map data and/or dynamic data.

The control system 200 may be configured to cause output of a user prompt signal in dependence on the further signal, for example if it is determined that a required highway exit junction approached by the host vehicle 10 is within a threshold driving time and/or distance. The user prompt signal may prompt the occupant to take an action to enable the host vehicle 10 to transition out of the autonomous mode. If the occupant takes the prompted action, the host vehicle 10 transitions out of the autonomous mode. If the occupant does not take the prompted action, the occupant may be determined to be non-responsive which is an internal hazard associated with the host vehicle 10, therefore the control system 200 may determine a requirement to stop the host vehicle 10 and cause the host vehicle 10 to stop accordingly. In some examples, the requirement to stop may be determined before the user prompt signal is output, for example in dependence on a vehicle characteristic, user characteristic and/or environment characteristic. For example, a failure of a vehicle component may have occurred or the occupant may be unconscious.

The user prompt signal may be presented to the occupant via HMI. The control system 200 may be configured to receive a user readiness signal from the occupant in response to the user prompt signal. The user readiness signal may be transmitted in dependence on user actuation of HMI or a vehicle control such as the steering wheel. In one example, the HMI comprises a plurality of input HMIs on the steering wheel. The input HMI may comprise buttons or any other appropriate means. The input HMIs may be located at left and right sides of the steering wheel with reference to a centred steering wheel, i.e. no steering lock applied. The input HMIs may be located such that at least one digit of each the occupant's hands can remain at least partially hooked over the circumferential tube-like member of the steering wheel, at 9 o'clock and 3 o'clock or 10 o'clock and 2 o'clock positions, when the input HMIs are actuated by the occupant's hands. The input HMIs may need to be pressed concurrently and/or for a threshold duration.

Additionally or alternatively, the user readiness signal may be transmitted in dependence on user actuation of a vehicle control such as the steering wheel, accelerator pedal or brake pedal. For example, turning the steering wheel or depressing the pedal by more than a threshold amount causes the user readiness signal to be transmitted. In other examples, the HMI could take any other appropriate form.

The control system 200 may be configured to determine whether a user readiness signal has been received within a predetermined period of time from the user prompt signal. For example, the predetermined period of time may be from the range approximately 10 seconds to several minutes, depending on the required trade-off between user reaction time and maximum autonomous mode driving time. If the autonomous mode is for highway driving only, the predetermined period of time may be longer, in the order of minutes rather than seconds. For example, the predetermined period of time may be two or more minutes. The predetermined period of time may depend on the level of autonomy of the host vehicle 10, and may be greater for level four than for level three. The predetermined period of time may vary in use in dependence upon the vehicle characteristic, the user characteristic and/or the environment characteristic. The predetermined period of time may be settable by the occupant although may not be below a minimum time. The control system 200 may be configured to output one or more reminder signals for presentation to the occupant via HMI, between transmitting the user prompt signal and receiving the user readiness signal. For example, the reminder signal may comprise at least one of an audible alert, a haptic alert, a visual alert. A characteristic of the reminder signals such as a frequency, volume, number of output HMIs employed, may vary for each subsequent reminder signal. In an implementation, the user prompt signal at 0 seconds causes an audible instruction, a first reminder signal at 20 seconds causes another audible instruction, and subsequent reminder signals at 30, 40, 50 seconds etc., each cause a combination of an audible instruction, and haptic pulses through the driver's seat and/or steering wheel.

The environment characteristic, vehicle characteristic and/or user characteristic may be as described above, wherein the user prompt signal is transmitted if one or more of the criteria described above are no longer satisfied. Additionally or alternatively, different environment characteristics, vehicle characteristics and/or user characteristics may be defined for the determination whether to transmit the user prompt signal.

Regarding the environment characteristic, the control system 200 may be configured to transmit the user prompt signal in response to a current or upcoming change of driving environment. The upcoming change may be within a threshold distance or driving time. The change may be caused by non-satisfaction of the road type criterion and/or weather criterion as described above. Additionally or alternatively the change may be caused by detection of one or more of: a traffic light on the road; a toll booth on the road; an off-ramp from the road for following a navigation route. The off-ramp may specifically be for leaving a highway onto a minor road, rather than for transitioning from one highway to another highway.

Regarding the user characteristic, the control system 200 may be configured to transmit the user prompt signal in response to a changed user characteristic. For example, the change may be caused by non-satisfaction of the awareness criterion and/or the physiological criterion. In an implementation, the user prompt signal may be transmitted if the occupant is drowsy or unconscious.

Regarding the vehicle characteristic, the control system 200 may be configured to transmit the user prompt signal in response to a changed vehicle characteristic. For example, the change may be caused by non-satisfaction of the detection range criterion or any other of the criterion or situations described earlier. Additionally or alternatively, the change may be caused by a determination of a fault with the host vehicle 10, which is defined as a type of internal hazard associated with the host vehicle 10. The fault may be caused by one or more of: power failure; communication failure; or sensing means failure. The power failure may comprise an electrical power failure such as a failure of the power supply and/or backup power supply. The power failure may comprise a mechanical power failure such as an inhibited availability of propulsive torque from the prime mover, which may be caused by the prime mover becoming inoperable or entering a limp home mode. The mechanical power failure may correspond to a failure of a drivetrain component such as the transmission or differential. The mechanical power failure may correspond to a failure of an actuator with a responsibility for the dynamic driving task in autonomous mode. The power failure may comprise failure of headlamps at night. The communication failure may comprise a failure of one or more of the electronic communication networks. The communication failure may comprise a failure of one or more controllers with a responsibility for the dynamic driving task in autonomous mode. The communication failure may comprise a failure of a domain controller. The sensing means failure may comprise a failure of one or more of the sensing means.

The fault may trigger a determination that the host vehicle 10 is to stop. The user prompt signal may be transmitted to enable the occupant to control how the host vehicle 10 is stopped. The control system 200 may be configured to stop the host vehicle 10 without driver intervention.

Various methods will now be described for being performed during autonomous driving in the autonomous mode. At least some of the methods are in accordance with one or more aspects of the present invention. The control system 200 could be configured to implement one or more of the methods. Computer software could be configured to, when executed, perform one or more of the methods via the control system 200.

Figure 3:
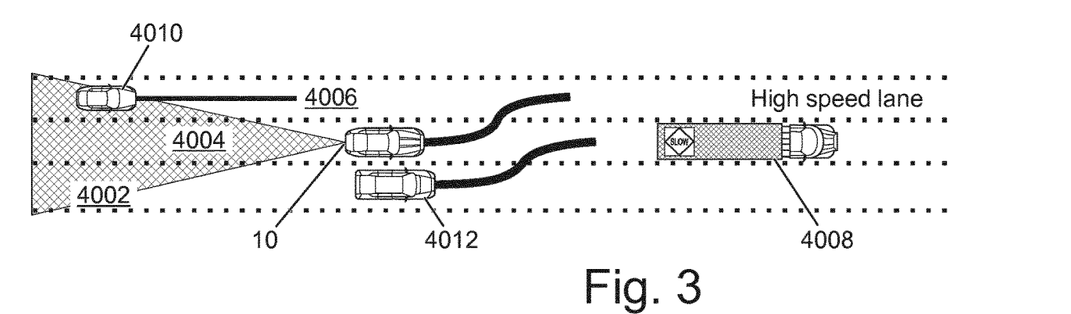
FIG. 3 illustrates an example of an overtaking manoeuvre.
Figure 4:
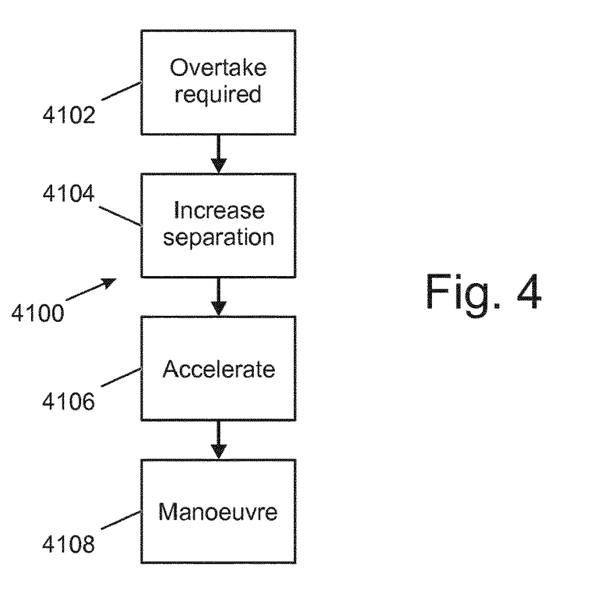
FIG. 4 illustrates an example of a method.
Figure 5:
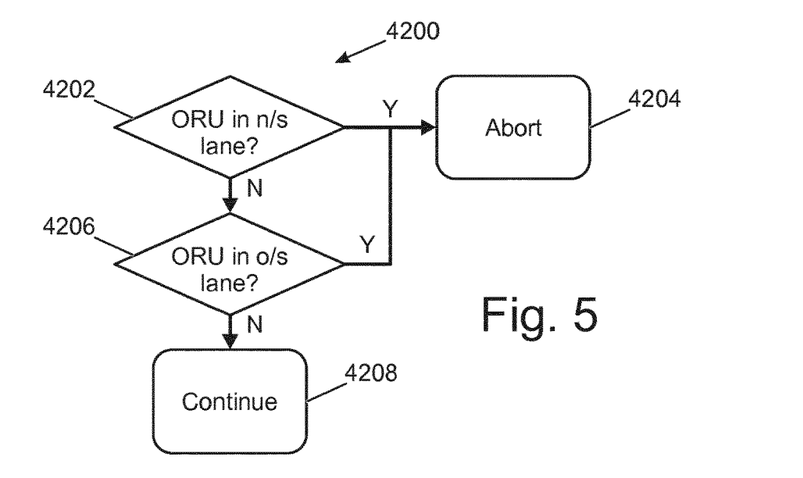
FIG. 5 illustrates an example of a method.

With reference to FIGS. 3 to 5, there is provided a method 4100, 4200 for controlling the host vehicle 10 operable in the autonomous mode (and, in some examples, operable in the non-autonomous mode), the method comprising: determining 4102 a requirement for the host vehicle 10 within a first lane 4004 to manoeuvre into a second lane 4006 to overtake a road user 4008; causing 4104 an increase of separation of the host vehicle 10 from the road user 4008 in dependence on the determination; subsequently causing 4106 acceleration of the host vehicle 10 towards the road user 4008, such that the host vehicle 10 achieves a higher speed than the road user 4008; and causing 4108 a manoeuvre of the host vehicle 10 into the second lane 4006 to perform the overtake. The second lane 4006 may be for travel in the same direction as the first lane.

By way of context, consider for example the use case of FIG. 3. The host vehicle 10 in a first lane 4004 needs to overtake another road user 4008. The other road user 4008 may be at least partially in the first lane 4004 or entering the first lane 4004 downstream of the host vehicle 10 and may be travelling slower than the host vehicle 10. The overtake requires a manoeuvre into the second lane 4006. The second lane 4006 may be an offside lane for higher speed vehicles. Overtaking on the inside, i.e. in a third nearside lane 4002, may be prohibited, or not in other examples.

Some vehicle overtaking functions may commence acceleration after the manoeuvre. It would be beneficial if the host vehicle 10 could be at a desired speed when entering the second lane 4006, to match speeds and not inconvenience other road users.

Further, some prior vehicle overtaking functions may commence acceleration without first increasing the separation to the other road user 4008. The increase in speed that can be achieved is therefore less due to the limited available acceleration space behind the road user 4008 to be overtaken.

Further, some vehicle overtaking functions fail to protect their 'slot' in a line of traffic in the first lane 4004 in case of a late abort of the manoeuvre. As shown in FIG. 3, a road user 4012 in the third (nearside) lane 4002 may enter the former slot of the host vehicle 10 in the first lane 4004 as soon as the host vehicle 10 has started the overtaking manoeuvre. Consequently, late-aborting the overtaking manoeuvre may be difficult to negotiate.

The present methods seek to alleviate at least some of the above problems. The present methods of FIGS. 4 and 5 may be implemented as a sub-routine of the lane change algorithm and/or the vehicle overtaking function, in an example.

The method 4100 comprises, at block 4102, determining a requirement for the host vehicle 10 within a first lane 4004 to manoeuvre into a second lane 4006 to overtake a road user 4008.

Determining the requirement to overtake the road user 4008 may comprise detecting the road user 4008. The road user 4008 may be detected to be in the planned path of the host vehicle 10 downstream of a current location of the host vehicle 10. The road user 4008 may be travelling in a same direction as the host vehicle 10. The road user 4008 may be in a field of view of one or more front sensors of the sensing means. The road user 4008 may be at least partially in the first lane 4004 (in the first lane 4004, entering the first lane 4004, or straddling the first lane 4004 and another lane). The overtake may be determined as unnecessary if the road user 4008 is determined to be exiting the first lane 4004.

Determining the requirement to overtake the road user 4008 may comprise detecting a parameter indicative of a rate of closure of the host vehicle 10 to the road user 4008. The parameter may be indicated by the range detection means 310. The parameter may indicate the separation of the host vehicle 10 to the road user 4008. The rate of closure may be indicated by determining the change of separation with respect to time. In some examples, the exact speed of the road user 4008 may be known. The requirement to overtake the road user 4008 may be determined when an overtaking condition is satisfied. For example, the condition may require the rate of closure to be above a threshold. The condition may require the difference in speeds to be above a threshold. The condition may require the threshold time associated with the nearside bias function to be below a threshold.

Determining the requirement to overtake the road user 4008 may be followed by determining an opportunity to overtake the road user 4008. Determining an opportunity to overtake the road user 4008 may be dependent on detection of a space to the side of the road user 4008, such as an offside lane for passing the road user 4008. Determining an opportunity to overtake the road user 4008 may be dependent on detection of a space ahead of the road user 4008 if visible to the sensing means, so that the host vehicle 10 can move back to the nearside after the overtake. Determining an opportunity to overtake the road user 4008 may be dependent on the space availability signal as described earlier. Front, rear and/or side sensors of the sensing means may be used for determining the opportunity. If there is an opportunity, the method 4100 continues. If not, the method 4100 exits.

At block 4104, the method comprises a separation phase. The separation phase comprises causing an increase of separation of the host vehicle 10 from the road user 4008 in dependence on the determination. This gives the host vehicle 10 a run-up so that an even higher overtaking speed can be achieved.

The increase of separation may comprise decelerating the host vehicle 10. In some examples, the increase of separation may comprise allowing the road user 4008 ahead of the host vehicle 10 to accelerate faster than the host vehicle 10. The host vehicle 10 may stay in the first lane 4004 during block 4104.

The target speed of the host vehicle 10 at the target separation may be no less than a predetermined minimum. The predetermined minimum may be substantially the speed of the road user 4008 to be overtaken. In other examples the predetermined minimum may substantially be a minimum speed of the road on which the host vehicle 10 is travelling. The above preserves momentum, is within the expectation of the occupant or other road users and improves comfort. The rate of change of separation and/or one of its derivatives may be constrained for comfort and predictability of the manoeuvre to other road users.

The target amount of increased separation may be a fixed or variable (context-specific) separation behind the road user 4008. The variable amount of increased separation may be calculated as part of block 4104. The calculation may take into account at least one speed-dependent variable associated with the host vehicle 10 and/or the road user 4008, such as speed. The calculation may comprise calculating a target. The target may comprise a target speed of the host vehicle 10 at a target position. The target position may correspond to the position at which the host vehicle 10 substantially enters the second lane 4006. The target position may correspond to a position behind the road user 4008 at which the host vehicle 10 must substantially leave the first lane 4004. The distance of the target position behind the road user 4008 may be calculated. The distance may be sufficient to enable the host vehicle 10 to slow and match the speed of the road user 4008 in the event of an aborted overtake, without collision or causing a performance index associated with safety to exceed a threshold.

The target speed at the target position may be dependent on a speed of the road user 4008 to be overtaken. The target speed may be greater than the speed of the road user 4008 to be overtaken. The target speed may be a predetermined amount greater than the speed of the road user 4008 to be overtaken, for performing the overtake quickly. However, the target speed may be constrained by a detected speed limit.

Calculating the target amount of increased separation may also be dependent on acceleration of the host vehicle 10. The acceleration may correspond to a target acceleration (torque demand) of the host vehicle 10. The target acceleration may be for reaching the target speed at the target position for entering the second lane 4006. The target acceleration may be less than a maximum capable acceleration of the host vehicle 10.

Other variables could also be taken into account when calculating the increased separation. For example, the time taken to accelerate from the target separation position to the target position for entering the second lane 4006 may be constrained.

With knowledge of factors such as the target speed of the host vehicle 10 at the target separation, the speed of the road user 4008 to be overtaken, the acceleration of the host vehicle 10, the time taken, etc, the target amount of increased separation can be determined.

Further variables may also affect the increased separation. For example, at least one variable associated with at least one follower road user behind the host vehicle 10 may be taken into account. The other road user may be in the first lane 4004 or another nearside lane 4002. The variable may be indicative of a deceleration capability of the follower road user. The variable may be indicative of a reaction time of the follower road user. The variable may be indicative of a separation of the follower road user from the host vehicle 10. The variable may be indicative of convergence or divergence of the follower road user and the host vehicle 10. The variable may change the target amount of increased separation. For example, a proximal follower road user may reduce the target separation. The variable may change the target speed of the host vehicle 10 at the target separation. For example, the target speed may be no slower than the speed of the follower road user. The variable may change the constrained rate of change of separation or one of its derivatives. For example, the separation may change at a slower rate when a follower road user is proximal to the host vehicle 10. These calculations reduce the chance that follower road users will be inconvenienced and reduce the chance that they will attempt to overtake the host vehicle 10, rendering the second lane 4006 inaccessible.

The example variables may comprise a variable associated with infrastructure. For example, the variable may be indicative of changed braking distance. An example of such a variable may be indicative of road surface friction. The variable may distinguish between wet and dry surfaces. This information may be obtained from weather data, an environment characteristic, a road sensor, or even which vehicle driving mode is activated. When road surface friction is lower, factors such as the deceleration capability, reaction time, separation of the follower road user, target position, target speed(s), amount of separation, may be changed to account for the associated increase of braking distance.

At block 4106, the method comprises an acceleration phase. The acceleration phase comprises causing acceleration of the host vehicle 10 towards the road user 4008, such that the host vehicle 10 achieves a higher speed than the road user 4008.

At least part of the acceleration phase takes place in the first lane 4004. The host vehicle 10 may continuously accelerate between the position associated with the target amount of separation and the target position for entering the second lane 4006. Optionally, the acceleration may continue even once the host vehicle 10 has changed lane into the second lane 4006.

The change of acceleration from the end of the separation phase to the start of the acceleration phase may be smoothed to reduce jerk. For example, the acceleration may increase from a value at the end of the separation phase to the target value non-instantaneously.

During the separation phase and/or the acceleration phase, the method may cause the host vehicle 10 to automatically flash the turn signals (indicators) facing the second lane 4006, so that it is clear to any follower road users why the separation is increasing.

During the separation phase and/or the acceleration phase, the method may control the lane centring algorithm to cause the host vehicle 10 to change its lateral position towards the lane boundary between the first lane 4004 and the second lane 4006, to enable the sensing means to 'peek' around the road user 4008 to be overtaken. A substantial portion of the host vehicle 10, such as greater than 50%, may remain in the first lane 4004 until the target position for entering the second lane 4006 is reached, to 'guard' the host vehicle's current slot in traffic and discourage other road users such as road user 4012 from entering the slot.

At block 4108, the method comprises causing a manoeuvre of the host vehicle 10 into the second lane 4006 to perform the overtake. The path of the manoeuvre may be planned by the path planning algorithm. Specifically, the path may be required by the lane change algorithm. Specifically, the path may be required by the vehicle overtaking function.

Once the road user 4008 has been overtaken, the nearside bias function may seek an opportunity to change lanes back into a nearside lane such as the first lane 4004.

In some, but not necessarily all examples the method 4100 is implemented in dependence on detection of the speed limit of the road. For example, the amount of separation may depend on the speed limit. The separation may increase for higher speed limits such as derestricted roads to facilitate an increased run-up and therefore achieve a higher target speed at the target position for entering the second lane 4006. In some examples, the method 4100 is implemented if the speed limit is derestricted or exceeds a threshold and is otherwise not implemented.

With reference to FIGS. 3-5, there is provided a method 4200. The method 4200 may be an example sub-routine of the method 4100 of FIG. 4 or may be independent from FIG. 4. For example, the method 4200 may be a sub-routine of the lane change algorithm or vehicle overtaking function.

The method 4200 is a method for checking whether one or more abort conditions for changing lane is satisfied. The method 4200 comprises checking 4202, 4206 whether one or more abort conditions is satisfied, wherein if the one or more abort conditions is not satisfied, the host vehicle 10 completes 4208 the manoeuvre into the second lane 4006. One or more of the checks may be performed before the host vehicle 10 manoeuvres into the second lane 4006. If the one or more abort conditions is satisfied, the host vehicle 10 aborts 4204 the manoeuvre and remains in the first lane 4004.

Upon satisfaction of an abort condition, the method 4100 may abort the lane change and the host vehicle 10 may change its speed if necessary to resume following the road user 4008 in the first lane 4004 at a prescribed inter-vehicular distance. The lateral position of the host vehicle 10 may change from the position offset towards the second lane 4006 in a direction towards the centre of the first lane 4004, if necessary. One or more of the checks of abort conditions may be performed during the separation phase and/or the acceleration phase.

In FIG. 5, block 4202 relates to a first abort condition and block 4206 relates to a second abort condition. In other examples, any number of abort conditions may be checked, and in any order.

The first abort condition relates to a situation such as that shown in FIG. 3. The host vehicle 10 may be in a first lane 4004 which is not the most nearside lane. The host vehicle 10 may be changing lane to a second lane 4006 which may be offside of the first lane 4004. The lane change may be for any purpose, although checking the first abort condition is particularly advantageous in the situation when the lane change is for overtaking a road user 4008 or other solid object in the first lane 4004 whether moving or not. The road comprises a third lane 4002 neighbouring the first lane 4004, which may be offset to an opposite side of the first lane 4004 compared to the second lane 4006. Therefore, the third lane 4002 may be a nearside lane. The first abort condition is useful when there is the third lane 4002.

Satisfaction of the first abort condition may be determined by checking the third lane 4002 for another road user 4012 converging with or alongside the host vehicle 10.

'Alongside' relates to the situation in which the host vehicle 10 and other road user 4012 would make contact or a performance index associated with safety would exceed a threshold if they laterally converge. Lateral convergence would occur if the host vehicle 10 aborts the lane change after the other road user 4012 has commenced or completed changing lane from the third lane 4002 to the first lane 4004. Therefore, at least part of the road user 4012 may be laterally parallel to the host vehicle 10, or at least laterally parallel to the current slot in traffic of the host vehicle 10, wherein the current slot acts as an abort space into which the host vehicle 10 enters if the lane change is aborted.

'Converging' relates to the situation in which the other road user 4012 is expected to be alongside or within a prescribed longitudinal separation, for example because the other road user 4012 is currently behind the host vehicle 10 but is travelling faster than the host vehicle 10. In some examples, the other road user 4012 in the third lane 4002 may be ahead of the host vehicle 10 and travelling slower. The prescribed longitudinal separation may be a separation from the host vehicle 10 or from the abort space. The method may comprise determining whether the trajectory of the converging road user 4012 will result in the other road user 4012 being alongside or within the prescribed separation from the host vehicle 10 before the host vehicle 10 has committed to the (lateral) overtake or lane change. Committing to an overtake relates to the host vehicle 10 being unable to abort the overtake and move back into the first lane 4004 without colliding with the road user 4008/object to be overtaken, or without a performance index associated with safety exceeding a threshold. Committing to a lane change relates to the host vehicle 10 being substantially in the second lane 4006 such that the host vehicle 10 no longer has right of way in the first lane 4004.

If a road user 4012 in the third lane 4002 is converging with or alongside the host vehicle 10, the first abort condition is satisfied or is capable of being satisfied. Optionally, the first abort condition may be satisfied or is capable of being satisfied by a converging road user 4012 if the road user 4012 in the third lane 4002 is expected to be alongside the host vehicle 10 or within the prescribed separation before the host vehicle 10 has committed to the lane change.

In some, but not necessarily all examples, satisfaction of the first abort condition may require additional information about the road user 4012, such as whether a turn signal of the road user 4012 towards the first lane 4004 is being used, and/or whether the road user 4012 is laterally moving towards the first lane 4004.

The first abort condition may be checked before the second abort condition. The first abort condition may be the first of all the abort conditions to be checked. This advantageously ensures that the host vehicle 10 is able to retain its space in traffic in the event of satisfaction of any other abort condition. In other examples, the abort conditions can be performed in a different order or any order.

Satisfaction of the second abort condition may be determined by checking for another road user 4010 within the second lane 4006. The check may comprise checking if the road user 4010 in the second lane 4006 is converging with the host vehicle 10. The second abort condition may be capable of being satisfied when the road user 4010 in the second lane 4006 is expected to need to change its speed or course in dependence on the lane change. The second abort condition may be capable of being satisfied if the road user 4010 in the second lane 4006 is expected to be alongside the host vehicle 10 or within a prescribed longitudinal separation from the host vehicle 10, before the host vehicle 10 has committed to the lane change.

The first and/or second abort conditions may be checked one or more times during the separation phase and/or the acceleration phase. Advantageously, the second abort condition may be checked during the acceleration phase. The second abort condition may be checked immediately prior to committing to the overtake (e.g. less than approximately one second) such that if the second abort condition is satisfied the host vehicle 10 is able to slow down within the first lane 4004 without colliding with the road user 4008 to be overtaken or causing a performance index associated with safety to exceed a threshold.

As can be seen from FIG. 5, if all of the abort conditions are not satisfied, the method proceeds to block 4208 to complete the manoeuvre into the second lane 4006, and if any one of the abort conditions is satisfied, the method proceeds instead to block 4204 which aborts the lane change so that the host vehicle 10 remains in the first lane 4004.

With reference to FIG. 5, there is provided a method for controlling a host vehicle 10 operable in an autonomous mode, the method comprising: determining a requirement for the host vehicle 10 within a first lane 4004 to manoeuvre into a second lane 4006; checking whether an abort condition is satisfied, wherein satisfaction of the abort condition is determined by checking a third lane 4002 for another road user 4012 converging with or alongside the host vehicle 10 before the host vehicle 10 manoeuvres into the second lane 4006, wherein the third lane 4002 is on an opposite side of the first lane 4004 to the second lane 4006; and if the abort condition is satisfied, causing the host vehicle 10 to remain in the first lane 4004. The manoeuvre may be as described for FIG. 4 or different. The second abort condition is optional in FIG. 5.

For purposes of this disclosure, it is to be understood that the controller(s) 202 described herein can each comprise a control unit or computational device having one or more electronic processors 204. A vehicle and/or a system thereof may comprise a single control unit or electronic controller or alternatively different functions of the controller(s) may be embodied in, or hosted in, different control units or controllers. A set of instructions 208 could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium 210 (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The term 'if' is used herein in relation to the concept of conditional performance of a function 'if' a condition is satisfied. The term 'if' in this context means that the function is capable of being performed if the condition is satisfied and is not capable of being performed if the condition is not satisfied. Additional conditions (not stated) may also need to be satisfied before the function is performed. Therefore, although it may be that the stated condition is the only condition for performing some functions, the 'if' terminology herein does not limit to such scenarios.

'Separation', 'distance' and 'position' as disclosed herein are not intended to be limited to absolute values of distance. The terms can be normalised by speed. For instance, a separation or distance may be two seconds (at 10 metres per second).

The blocks illustrated in the Figures may represent steps in a method and/or sections of code in the computer program 208. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed. For the absence of doubt, the autonomous mode may be operable in non-highway roads.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a host vehicle operable in an autonomous mode, the control system comprising one or more controllers, the control system configured to:
   determine a requirement for the host vehicle within a first lane to manoeuvre into a second lane to perform an overtake;
   check whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and
   if the abort condition is satisfied, cause the host vehicle to remain in the first lane.

2. The control system of claim 1, wherein the one or more controllers collectively comprise:
   at least one electronic processor having an electrical input for receiving information for enabling the determination; and at least one electronic memory device electrically coupled to the at least one electronic processor and having instructions stored therein; and wherein the at least one electronic processor is configured to access the at least one memory device and execute the instructions thereon so as to cause the host vehicle to perform the determining a requirement, the checking whether the abort condition is satisfied, and the causing the host vehicle to remain in the first lane.

3. The control system of claim 1, configured to:
   check whether a second abort condition is satisfied, wherein if the abort condition and the second abort condition are not satisfied, the host vehicle completes the manoeuvre into the second lane, and wherein if any one or more of the abort condition and the second abort condition is satisfied, the host vehicle remains in the first lane.

4. The control system of claim 3, wherein satisfaction of the second abort condition is determined by checking for another road user within the second lane.

5. The control system of any one of claim 1, wherein the overtake is an overtake of a road user, wherein the control system is configured to:
   increase separation of the host vehicle from the road user to be overtaken in dependence on the determination; subsequently cause acceleration of the host vehicle towards the road user to be overtaken, such that the host vehicle achieves a higher speed than the road user to be overtaken; and
   manoeuvre the host vehicle into the second lane to perform the overtake.

6. The control system of claim 5, configured to check the abort condition at least after the host vehicle has commenced accelerating towards the road user to be overtaken.

7. The control system of claim 5, wherein the amount of the increased separation and/or acceleration is dependent on one or more of: at least one speed-dependent variable associated with the host vehicle and/or the road user to be overtaken; at least one variable associated with another road user behind the host vehicle; a variable associated with infrastructure.

8. A method for controlling a host vehicle operable in an autonomous mode, the method comprising: determining a requirement for the host vehicle within a first lane to manoeuvre into a second lane to perform an overtake; checking whether an abort condition is satisfied, wherein satisfaction of the abort condition is determined by checking a third lane for another road user converging with or alongside the host vehicle before the host vehicle manoeuvres into the second lane to perform the overtake, wherein the third lane is on an opposite side of the first lane to the second lane; and if the abort condition is satisfied, causing the host vehicle to remain in the first lane.

9. A vehicle comprising the control system of any of claim 1.

10. A control system for a host vehicle operable in an autonomous mode, the control system comprising one or more controllers, the control system comprising computer software that, when executed by the one or more controllers, causes the host vehicle to perform the method of claim 8.

11. A non-transitory, computer-readable storage medium storing instructions thereon that, when executed by one or more electronic processors, causes the one or more electronic processors to carry out the method of claim 8.

* * * * *